United States Patent
Howes et al.

(10) Patent No.: US 6,324,177 B1
(45) Date of Patent: Nov. 27, 2001

(54) METHOD AND APPARATUS FOR MANAGING CONNECTIONS BASED ON A CLIENT IP ADDRESS

(75) Inventors: Richard A. Howes, Roswell; Edward C. Kersey, Athens, both of GA (US)

(73) Assignee: Cisco Technology, San Jose, CA (US)

( * ) Notice: Subject to any disclaimer, the term of this patent is extended or adjusted under 35 U.S.C. 154(b) by 0 days.

(21) Appl. No.: 09/107,244

(22) Filed: Jun. 30, 1998

Related U.S. Application Data (63) Continuation-in-part of application No. 08/850,248, filed on Jan. 25, 1999, and a continuation-in-part of application No. 08/918,024, filed on Aug. 25, 1997, now Pat. No. 6,108,300, and a continuation-in-part of application No. 08/920,211, filed on Aug. 25, 1997, now Pat. No. 5,989,060, and a continuation-in-part of application No. 08/850,730, filed on May 2, 1997, now Pat. No. 6,061,349, and a continuation-in-part of application No. 08/850,836, filed on May 2, 1997, now Pat. No. 6,104,717.

(51) Int. Cl.[7] .................................................. H04L 12/28
(52) U.S. Cl. ........................................... 370/389; 370/392
(58) Field of Search .................................... 370/254, 389, 370/392, 395, 397, 399, 400, 401, 409, 466, 467, 475, 492; 709/201, 104, 105, 219, 220, 223, 224, 226, 229, 240, 100, 238, 203; 705/77; 713/201

(56) References Cited

U.S. PATENT DOCUMENTS

| | | | |
|---|---|---|---|
| 5,371,852 | | 12/1994 | Attanasio et al. ............... 395/200 |
| 5,617,417 | | 4/1997 | Sathe et al. ...................... 370/394 |
| 5,774,660 | * | 6/1998 | Brenda et al. ................... 709/201 |
| 5,809,235 | * | 9/1998 | Sharma et al. .................. 709/230 |
| 5,918,017 | * | 6/1999 | Attanasio et al. ............... 709/224 |
| 6,052,711 | * | 4/2000 | Gish ................................. 709/203 |

FOREIGN PATENT DOCUMENTS

WO 97/05727    2/1997   (WO) .

OTHER PUBLICATIONS

Web Page for Coyote Point Systems © 1997; www.coyote-point.com.

* cited by examiner

*Primary Examiner*—Chau Nguyen
*Assistant Examiner*—Inder Pal Mehra
(74) *Attorney, Agent, or Firm*—Van Pelt & Yi LLP

(57) ABSTRACT

A system and method are disclosed for assigning an incoming connection to a server. The method includes defining a client specific virtual machine object instance that is associated with a designated client IP address. An incoming packet is received that is associated with a new connection. The incoming packet has a packet source IP address, a packet source port number, a packet destination IP address, and a packet destination port number. A client specific virtual machine object instance is selected that is associated with the designated client IP address when the packet source IP address matches the designated client IP address. The packet destination IP address is translated to a physical machine IP address that is designated by the client specific virtual machine instance when the packet source IP address matches the designated client IP address so that the client specific virtual machine instance is selected when the designated client IP address matches the packet source IP address and the packet is routed to the physical machine that is designated by the client specific virtual machine instance.

19 Claims, 7 Drawing Sheets

METHOD AND APPARATUS FOR MANAGING CONNECTIONS BASED ON A CLIENT IP ADDRESS

CROSS REFERENCE TO RELATED APPLICATIONS

This application is a continuation in part of co-pending U.S. patent application Ser. No. 08/850,248, filed on Jan. 25, 1999 SYSTEM FOR DISTRIBUTING LOAD OVER MULTIPLE SERVERS AT AN INTERNET SITE, by Brantley W. Coile, et al. and U.S. patent application Ser. No. 08/850,730, filed on May 2, 1997 now U.S. Pat. No. 6,061,349, issued on May 9, 2000 SYSTEM AND METHOD FOR IMPLEMENTING MULTIPLE IP ADDRESSES ON MULTIPLE PORTS, by Brantley W. Coile, et al. and U.S. patent application Ser. No. 08/850,836, filed on May 20, 1997 now U.S. Pat. No. 6,104,717, issued on Aug. 15, 2000 SYSTEM AND METHOD FOR PROVIDING BACKUP MACHINES FOR IMPLEMENTING MULTIPLE IP ADDRESSES ON MULTIPLE PORTS, by Brantley W. Coile, et al. and U.S. patent application Ser. No. 08/918,024, filed on Aug. 25, 1997 now U.S. Pat. No. 6,108,300, issued on Aug. 22, 2000 METHOD AND APPARATUS FOR TRANSPARENTLY PROVIDING A FAILOVER NETWORK DEVICE, by Brantley W. Coile, et al. and U.S. patent application Ser. No. 08/920,211, filed on Aug. 25, 1997, now U.S. Pat No. 5,989,060, issued on Nov. 23, 1999 SYSTEM AND METHOD FOR DIRECT COMMUNICATION WITH A BACKUP NETWORK DEVICE VIA A FAILOVER CABLE, by Brantley W. Coile, et al. which are each incorporated herein by reference for all purposes.

This application is related to co-pending U.S. patent application Ser. No. 09/107,238, METHOD AND APPARATUS FOR MAINTAINING CONNECTION STATE BETWEEN A CONNECTION MANAGER AND A FAILOVER DEVICE, by Richard A. Howes, et al. filed concurrently herewith and U.S. patent application Ser. No. 09/107,261, METHOD AND APPARATUS FOR VIRTUALIZING A LOCALLY INITIATED OUTBOUND CONNECTION FROM A CONNECTION MANAGER filed concurrently herewith, which are each incorporated herein by reference for all purposes.

BACKGROUND OF THE INVENTION

1. Field of the Invention

The present invention relates generally to methods and apparatuses for load balancing incoming connections based on a source IP address. More specifically, the invention relates to creating a connection object that contains an IP address and port number corresponding to a physical machine that handles a connection from outside based on the IP address of the outside machine making the connection.

2. Description of the Related Art

With the recent explosive growth of the Internet, a very large percentage of businesses, including many small businesses, desire to have an Internet site that is dedicated to them. An Internet site is generally implemented on an Internet server which is connected to the Internet via an Internet service provider (ISP). Some Internet sites are busy enough to require a plurality of servers in order to handle all of the connections which are made to those sites. Accordingly, co-pending application Ser. No. 08/850,248 describes a system and method for monitoring the availability of servers at an Internet site which simulate a virtual server and distributing new connection requests to servers which are available for connections and which are likely to have faster response times.

For less visited sites, the opposite situation is presented. Instead of one site requiring a plurality of servers, it would be desirable to combine a plurality of sites on a single server, since each one of the individual sites would not require all of the capacity of the server in order to service its connection traffic. It is also true that Internet traffic tends to be distributed among sites in a manner which is nonhomogenous. That is, certain sites receive a very large quantity of traffic while others receive little or no traffic. Furthermore, traffic on certain sites may increase or decrease unpredictably. Accordingly, co-pending application Ser. No. 08/850,730 describes a system and method for sharing connection load among a group of servers in a manner that allows each server to service more than one site and multiple servers to share the load for individual sites.

In a situation where a number of web servers are configured to service a website, it is possible that a number of different Clients will want to access the site via the Internet. It should be noted that the terms "Client" and "server" are used herein for the purpose of example only and that the roles of Client and server may be reversed in certain applications within the spirit and scope of the present invention. It would be desirable if different levels of service could be provided to different Clients without necessarily partitioning the different web servers in a rigid way such as allocating certain web servers to certain Clients. It would be most desirable if all web servers could be available for all Clients but certain Clients could have priority both in the quality of server to which their connections are assigned and in how quickly their connections are assigned to a server.

Therefore, in addition to distributing connections among a group of servers based on a determination of which server is best able to handle the connection, it would also be useful if different connections could be distributed among different sets of servers based on the source of an incoming connection request. Specifically, it would be most useful if various outside entities or Clients could be selectively granted access to sets of servers providing different classes of service based on the class of service subscribed to by each outside entity. Also, it would be useful if different outside entities could be directed to different servers or ports running special processes intended for specific entities. For example, it might be desirable to provide a special welcome page to visitors from certain preferred companies. In other situations, it might be desirable to provide a special not welcome page to site abusers who are unwelcome either because they appear to be repeatedly connecting to the server in a malicious attempt to keep the server busy or because the Client has been determined to be undesirable for some other reason. It would also be useful if Client connections could be assigned to a particular server based on the type of traffic generated by the Client or the frequency of traffic generated by the Client.

What is needed, therefore, is an apparatus and method for assigning connections using load balancing and also for providing access to different groups of servers or ports based on the identity of the outside entity attempting to establish a connection. Such a system would could ideally integrate load balancing of connections among a group of web servers with discriminating between Clients based on the identity of the Client or the behavior of the Client. Such a system would make possible a scheme where Clients could be assigned to different levels of service but where all Clients could be serviced by all available web servers if the servers happen to be available. In addition, a way of sending site abusers a not welcome page when they attempt to connect to the site is needed. Also, it may be desirable to welcome particular Clients who are customers from a particular company with a special welcome page.

SUMMARY OF THE INVENTION

Accordingly, the present invention provides a method of assigning connections to different web servers based on the Client IP address. The disclosed system provides faster dedicated service to certain Clients who have paid for special service. Also, different users may be sent to different applications running on different servers and certain servers are restricted to certain users. Incoming SYN packets are analyzed to determine the source IP address of new connection requests. The source IP address is used to determine which web server is assigned to handle the connection requested by the SYN packet.

It should be appreciated that the present invention can be implemented in numerous ways, including as a process, an apparatus, a system, a device, a method, or a computer readable medium. Several inventive embodiments of the present invention are described below.

In one embodiment, a method for assigning an incoming connection to a server includes defining a client specific virtual machine object instance that is associated with a designated client IP address. An incoming packet is received that is associated with a new connection. The incoming packet has a packet source IP address, a packet source port number, a packet destination IP address, and a packet destination port number. A client specific virtual machine object instance is selected that is associated with the designated client IP address when the packet source IP address matches the designated client IP address. The packet destination IP address is translated to a physical machine IP address that is designated by the client specific virtual machine instance when the packet source IP address matches the designated client IP address so that the client specific virtual machine instance is selected when the designated client IP address matches the packet source IP address and the packet is routed to the physical machine that is designated by the client specific virtual machine instance.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
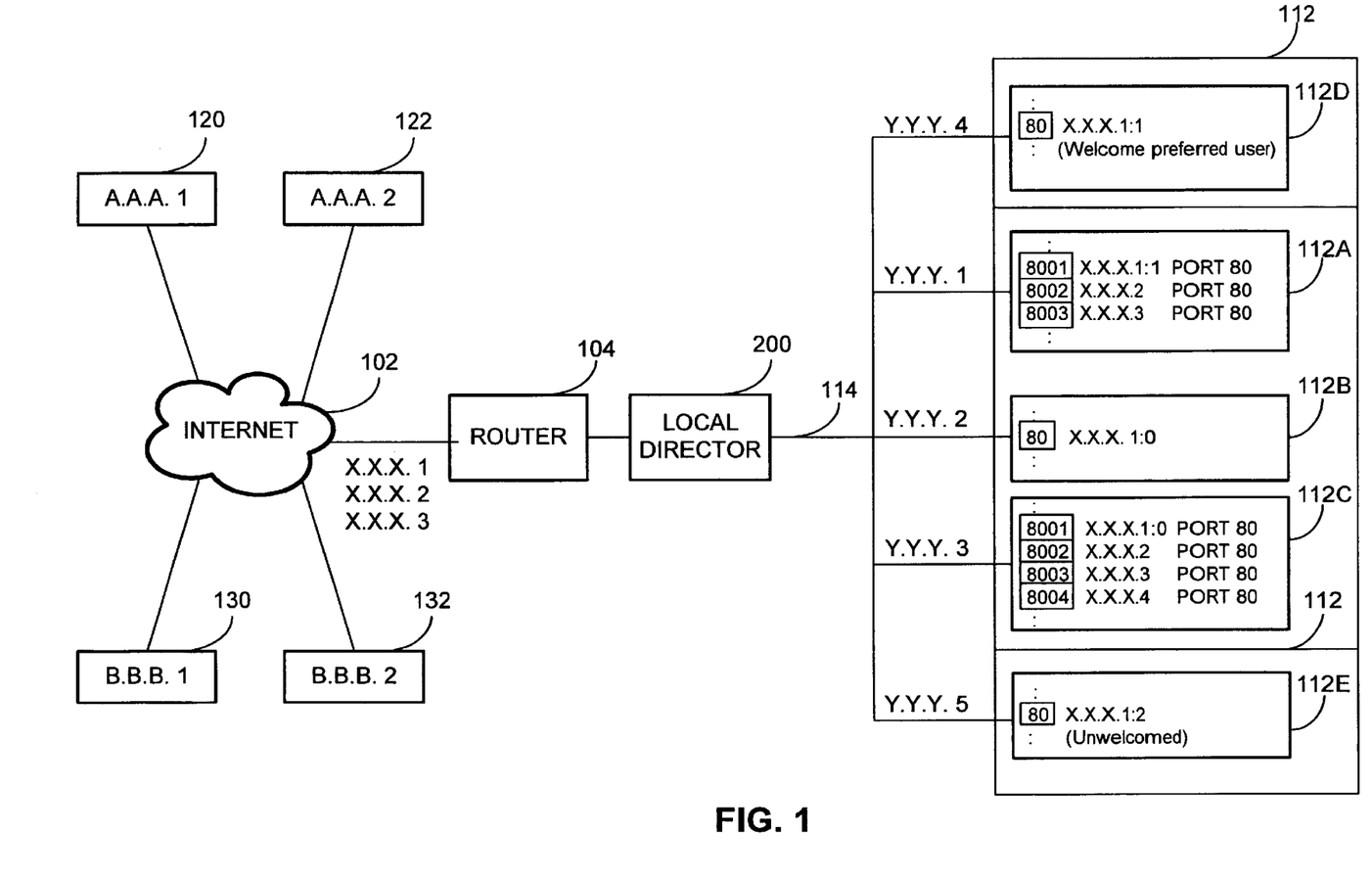
FIG. 1 is a block diagram illustrating a Local Director that distributes outside connections to a group of physical machines that implement several web sites.

FIG. 1 is a block diagram illustrating a Local Director® that distributes outside connections to a group of physical machines 112 (also referred to as real machines) that implement several web sites. Several Clients are shown which may connect to the websites that are implemented. A Client 120 has an IP address A.A.A.1 and a Client 122 belongs to the same subnet and has an IP address A.A.A.2. Also, a Client 130 has an IP address B.B.B.1 and a Client 132 that belongs to the same subnet has an IP address B.B.B.2. Clients make connections to virtual machines that have virtual IP addresses that are known to the Client. Each port of each virtual machine is bound to one or more real ports on a real machine. When a new connection is requested for a virtual machine port, then one of the real machine ports that is bound to the virtual machine port is selected to handle the connection. The selection is made using a load balancing scheme or other distribution scheme that distributes connections among all of the real ports that are bound to the virtual machine port specified in the incoming SYN packet.

Thus, the Local Director uses a group of physical machines to implement virtual machines that appear to the outside world to be handling connections. In addition, special instances of virtual machines having the same IP address may be defined that handle connections from certain source IP addresses and are bound to certain physical machines designated to handle those connections. Physical machine 112B is bound to a special instance of the virtual machine that corresponds to IP address X.X.X.1. The special instance of X.X.X.1 has a Bind ID of 0 and is denoted X.X.X.1:0. Similarly, physical machine 112D is bound to a special instance of the virtual machine with IP address X.X.X.1 that has a Bind ID of 1. This is denoted X.X.X.1:1. Also, physical machine 112E is bound to an instance of the virtual machine with a Bind ID of 2, denoted by X.X.X.1:2. Physical machine 122A has a port which is bound to X.X.X.1:1 and physical machine 112C has a port which is bound to X.X.X.1:0. The physical machines may also have other ports which are bound to other virtual IP addresses, as is shown. When a physical machine is bound to an instance of a virtual machine, a virtual port of the virtual machine may also be specified so that the physical machine is bound to an instance of a virtual machine that includes a virtual IP address and a specific virtual port. For the purpose of clarity, virtual port numbers are omitted from FIG. 1.

Although the users at A.A.A.1, A.A.A.2, B.B.B.1, and B.B.B.2 each connect to a single virtual IP address, X.X.X.1, the different users at different source IP addresses are sent to different physical machines when they request a connection. That is because the different instances of the virtual machine have different Bind ID's and each Bind ID may service a different outside Client that has a different IP address.

In the example shown, X.X.X.1:1 is an instance of the virtual machine X.X.X.1 that is made available to preferred users. The physical machines assigned to the virtual machine may be faster, may have fewer Clients assigned to them so they tend to be less backlogged, or may simply have special processes running on them for preferred users. The physical machines are bound to the instance of the virtual machine object X.X.X.1 that is bound to Bind ID 1. Physical machine 112D includes a number of ports which are bound to various ports that may be specified in a SYN packet. Physical machine 112D handles connections for packets that include a destination IP address X.X.X.1 and a source IP address that corresponds to an IP address that is assigned to Bind ID 1. Physical machine 112A includes a port 8001 that receives connections with a destination port 80 and a destination address X.X.X.1 that come from a Client that is bound to Bind ID 1. Port 8001 may run a special process for preferred users connecting to port 80.

Similarly, physical machines 112B and 112C include ports which are bound to the instance of the virtual machine that corresponds to X.X.X.1 and Bind ID 0. Bind ID 0 is, in one embodiment, a special Bind ID that corresponds to any source IP address that is not assigned to any other Bind ID. Thus, Bind ID 0 could be assigned to the general public. A physical machine 112E has an IP address Y.Y.Y.5 and includes ports that are bound to an instance of a virtual machine object with IP address X.X.X.1 and Bind ID equal to 2. Bind ID 2 corresponds to Clients or users who for some reason are not welcome at the website. Thus, SYN packets with a source IP address that corresponds to such a Client are handled by virtual machine X.X.X.1 with a Bind ID 2 and are directed to physical machine 112E. Physical machine 112E runs special processes on its ports that either drop the connection or notify the user that the connection is unwelcome.

Thus, user 120 with IP address A.A.A.1 may be assigned to the instance of virtual machine X.X.X.1 with a Bind ID of 1 so that user 120 is treated as a preferred user and has access to certain physical machines such as 112D and 112A that are bound to X.X.X.1:1. Other users such as user 130 at IP address B.B.B.1 may be unwelcome users and may have their connection requests handled by a physical machine such as physical machine 112E which runs special process and is bound to the instance of virtual machine X.X.X.1 with a Bind ID of 2. Other users which are not specified and are not assigned to a specific Bind ID are serviced by physical machines 112B and 112C which are bound to the instance of virtual machine X.X.X.1 with a Bind ID of 0. The status of any particular user may be changed by simply assigning the IP address of the user to a different instance of virtual machine X.X.X.1.

Thus, all users ask for the same IP address, X.X.X.1, but they are treated differently based on the source IP address in the SYN packet that is sent to request a connection. The connection is assigned to a virtual machine with a Bind ID that corresponds to the initiator of the connection. A preferred user such as the user at IP address A.A.A.1 does not need to send packets to a special IP address in order to receive special treatment. The user need only connect to a standard IP address that may be published to all users including preferred users, general users, and even undesirable users. The preferred user's connection will be assigned to a special instance of a virtual machine that is bound to physical machines that run special processes for preferred users or provide superior response for preferred users. An undesired user such as the user at B.B.B.1, may know the same IP address that a preferred user knows, but when user B.B.B.1 attempts to connect to that address, the Local Director will assign the undesired user's connection to a different instance of virtual machine X.X.X.1 that is bound to a physical machine that runs a process for unwelcome users. Other users that are neither preferred or undesired have their connection assigned to an instance of a virtual machine that is bound to physical machines that service connections from such unclassified users.

It should be noted that in some embodiments, the instances of virtual machines that are assigned to preferred users may also be bound to physical machines which serve unclassified users as well. When this occurs, preferred users will have access to physical machines serving unclassified users when the physical machines serving preferred users are busy. In other embodiments, preferred users are only sent to physical machines that serve unclassified users when one or all of the physical machines serving preferred users has failed. Thus, the Local Director assigns incoming connections from a preferred user to a special instance of a virtual machine. The virtual machine may then either direct the connection to a special physical machine that services only the preferred user or to a general machine that services unclassified users when the special physical machine is busy or failed.

Figure 2:
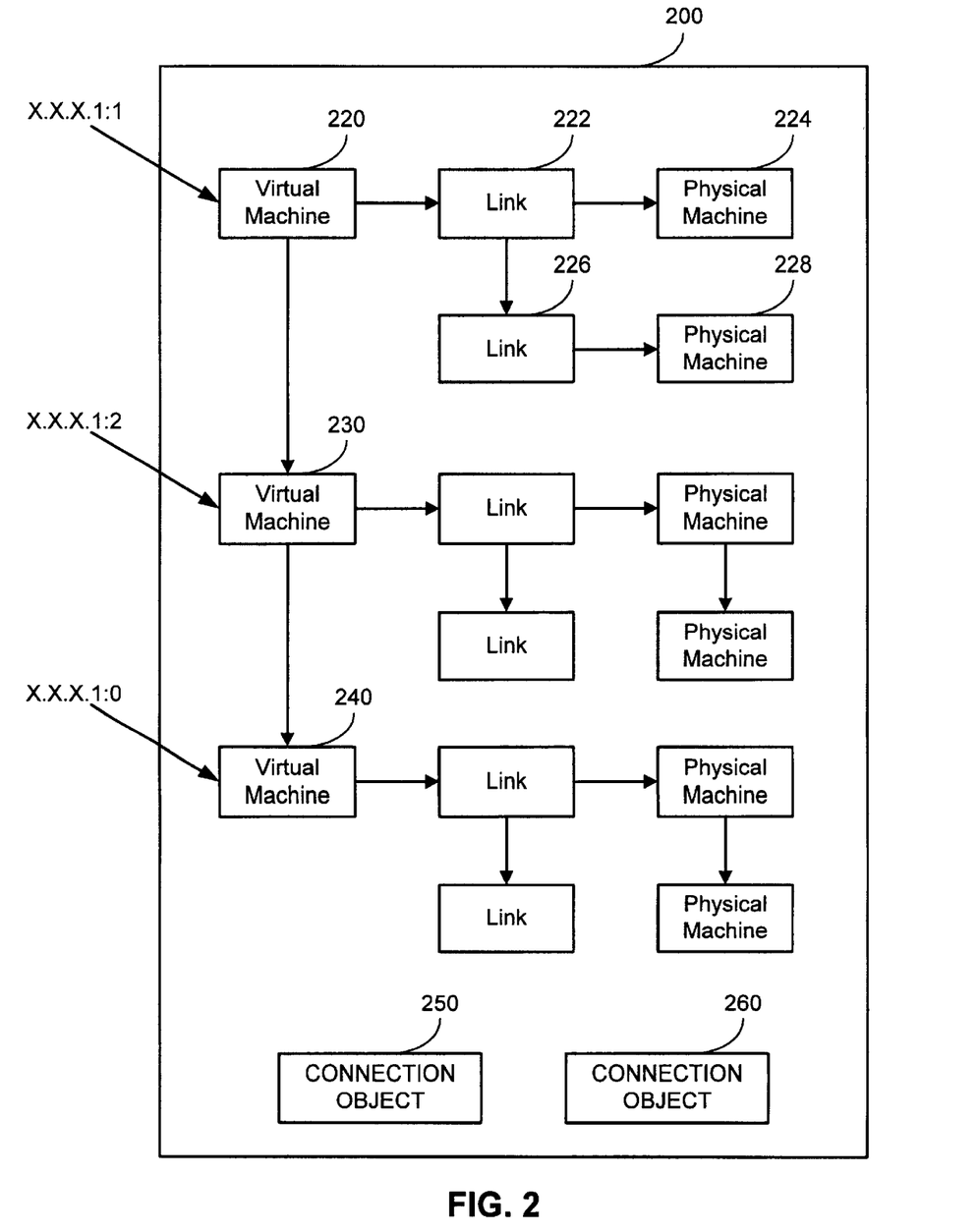
FIG. 2 is a block diagram illustrating an arrangement of data structures within a Local Director.

FIG. 2 is a block diagram illustrating an arrangement of data structures within a Local Director 200 that keeps track of the virtual machines implemented on Local Director 200 and the physical machines available to implement those virtual machines. The data structures are described in further detail in FIG. 3A through FIG. 3D. A first virtual machine object 220 stores information about a first virtual machine. Virtual machine object 220 includes an IP address for a virtual machine, a port number for the virtual machine, and a Bind ID, the purpose of which will be described below.

Virtual machine object 220 also points to a Link object 222 that points to a physical machine object 224. Link object 222 also points to another link object 226 that points to a physical machine object 228. Together, the virtual machine objects form a linked list that facilitates searching for the virtual machine which corresponds to a new connection request. Likewise, the link objects form a linked list that facilitates searching for a physical machine that is bound to a virtual machine to handle a new connection to the virtual machine. A connection object 250 and a connection object 260 contain pointers to the virtual machines and physical machines that correspond to the connections that they represent.

Each virtual machine object includes a Bind ID. Each of the virtual machine objects may have the same virtual IP address, but the virtual machine objects are distinguished by their Bind ID's and port numbers, if a port number is specified. In the example shown, the first instance of the virtual machine with IP address X.X.X.1 is represented by virtual machine object 220 with Bind ID 1. Virtual machine object 220 stores the Bind ID 1 which distinguishes virtual machine object 220 from the other virtual machine objects having the same virtual IP address. Virtual machine object 230 corresponds to a second instance of virtual machine X.X.X.1 with Bind ID 2. Virtual machine 240 contains the general Bind ID 0. Virtual machine 240 handles connections coming from source IP addresses that are not bound to virtual machine objects that include Bind ID 1 or 2. Once different Bind ID's are created for each of the virtual machine objects, it is possible to create Bind ID objects that point to different virtual machine objects that have the same IP address and port number but different Bind ID's. Thus, different instances of a virtual machine object for a virtual IP address are defined and each different instance of the virtual machine object has a different Bind ID.

Figure 3A:
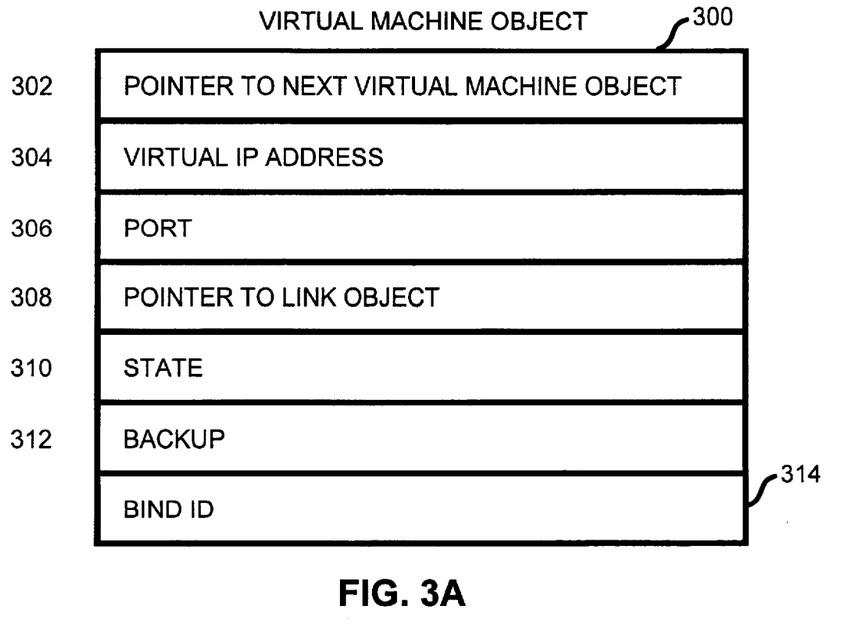
FIG. 3A is a block diagram illustrating the data structure of a virtual machine object.

FIG. 3A is a block diagram illustrating the data structure of a virtual machine object 300. Virtual machine object 300 includes a pointer 302 to the next virtual machine object to facilitate searching through the virtual machine objects. Virtual machine object 300 also includes a virtual machine IP address 304 which stores the IP address of one of the virtual machines that is being implemented by Local Director 300. A virtual port 306 specifies a virtual port on a virtual machine that the virtual machine object represents. A virtual machine object may represent all ports of a virtual machine or a specific port may be designated by the virtual machine object if the virtual machine object only represents a certain port. A pointer 308 to a link object facilitates searching for the physical machine object which has the best predicted response according to the chosen session distribution scheme. A state variable 310 stores the state of the virtual machine. A backup variable 312 stores a backup for the virtual machine. State variable 310 indicates the state of the virtual machine. Possible states include in service, out of service, or failed. A virtual machine is failed if all of the physical and virtual machines available to service it are failed.

A Bind ID field 314 stores a Bind ID for the virtual machine object. The Bind ID distinguishes different instances of a virtual machine object that include the same virtual IP address. A zero Bind ID indicates that the virtual machine object corresponds to a general virtual machine that is available for incoming SYN packets from foreign source IP addresses that have not been assigned to a particular virtual machine. A non-zero Bind ID indicates that the virtual machine object is assigned to or is available to be assigned to specific foreign source IP addresses that correspond to Clients that are handled in a special manner as described above.

Figure 3B:
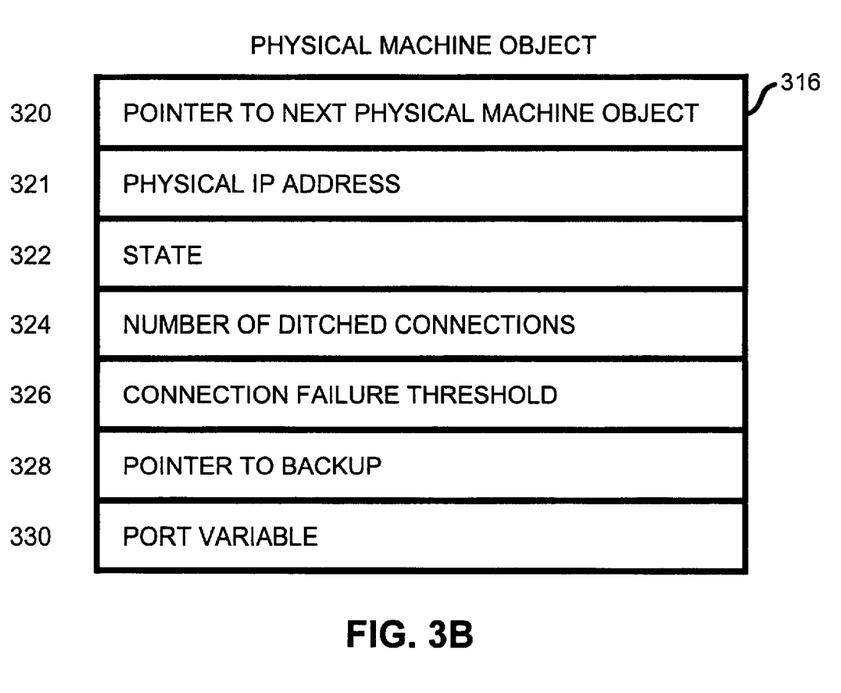
FIG. 3B is a block diagram illustrating the data structure of a physical machine object.

FIG. 3B is a block diagram illustrating the data structure of a physical machine object 316. Physical machine object 316 is used to store information related to a particular physical machine that is selected to serve connections to certain virtual machines. Physical machine object 316 contains a pointer 320 to the next physical machine object which facilitates searching among the physical machine objects. Physical machine object 316 also contains the real IP address 321 of the physical machine which it represents. A variable 322 stores the state (for example, in service or failed) of the physical machine and a variable 324 stores the number of ditched connections to the physical machine. Ditched connections are connections that are not successfully made after a number of resend of a SYN request. A variable 326 stores the connection failure threshold that determines the number of ditched connections required to fail the machine and a pointer 328 points to a backup machine. A port variable 330 stores a port number which indicates whether physical machine object 320 corresponds to an individual port on a machine. If port variable 330 is zero, then physical machine object 320 corresponds to all ports of a physical machine. Any other number is interpreted as a port number that the physical machine object represents.

Figure 3C:
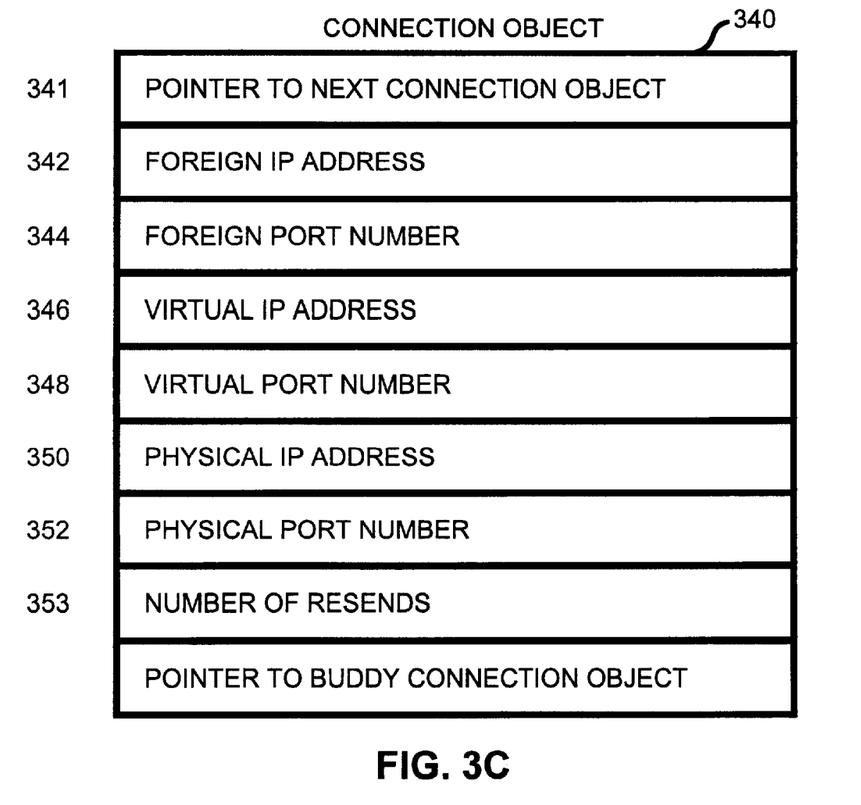
FIG. 3C is a block diagram illustrating a connection object data structure.

FIG. 3C is a block diagram illustrating a connection object data structure 340. Connection object 340 stores information related to individual connections made from a Client to one of the physical machines. Connection objects store the information necessary to ensure that packets transmitted from the Client to a virtual machine after a connection is established are routed to the physical machine for which the connection has been established. Connection object 340 includes a pointer 341 to the next connection object on its linked list hash chain. This pointer facilitates searching among the connection objects. In a preferred embodiment, the individual connection objects are stored in a hash chain to facilitate searching. Connection object 340 also includes the foreign IP address 342 and foreign port number 344 of the Client that is associated with the connection and the virtual machine IP address 346 and virtual machine port number 348 of the virtual machine that is being implemented for the connection. Connection object 321 also contains a physical IP address 350 of the physical machine to which the connection is assigned. A physical machine port number 352 is also included in the connection object. Variable 353 stores the number of times that a SYN packet has been resent to a physical machine to establish a connection. A pointer 354 is used to point to a buddy connection object, if a buddy connection exists.

Using the data structures shown in FIGS. 3A through 3C, Local Director 300 is able to provide the necessary IP addresses, port numbers, and pointers to establish a connection and define a connection object. The connection object contains all the information necessary to change the destination IP address and port number of incoming packets to the IP address and port number of a physical machine that is implementing a virtual machine. Likewise, the connection object contains all the information necessary to change the source IP address and port number of outgoing packets to the IP address and port number of a physical machine that is implementing a virtual machine. The connection object also keeps track of the number of resends of a SYN packet to establish a connection. Connections can be ditched after a certain number of resends and a new physical machine assigned to the connection. A physical machine object tracks the number of ditched connections for each physical machine and Local Director 300 uses this information to fail machines that ditch too many consecutive connections. Each physical machine object also contains a pointer to a backup physical machine so that if the physical machine fails, a backup can be made available.

Figure 3D:
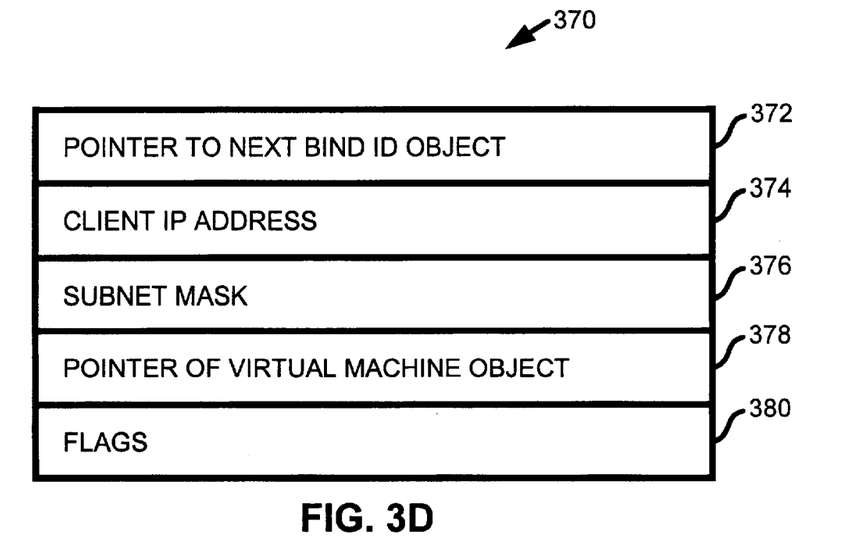
FIG. 3D is a block diagram illustrating the data structure for a Bind ID object.

FIG. 3D is a block diagram illustrating the data structure for a Bind ID object 270. Bind ID object 270 includes a pointer to the next Bind ID object 272. Pointer 272 enables the Bind ID objects to be linked together in a linked list. It should be noted that, in other embodiments, the Bind ID object may be stored in a different type of data structure. A Client IP address field 274 stores the IP address of the Client for which the Bind ID object was created. Incoming SYN packets from that Client are identified as belonging to a particular Bind ID object by matching the packet source IP address to the stored Client IP address. A subnet mask 276 is used to enable the Bind ID object to match all Client IP addresses in a subnet. In the description that follows it will be assumed that the Bind ID object only corresponds to a single Client; however, it should be remembered that Bind ID objects may be assigned to a group of Clients in a subnet using the subnet mask. A pointer to a virtual machine object 278 points to a virtual machine object that has a non-zero Bind ID field and that is therefore available to be bound to a particular Client IP address via Bind ID object 270. A field 280 for status flags is also included. In different embodiments the flags may be used to indicate the status of the Bind ID objects. In one embodiment, a single status flag is included that indicates whether the Bind ID object is in use or not in use. Only Bind ID objects that are currently in use are searched when a new incoming SYN packet is received. Bind ID objects which are not in use are made available for the assignment of a virtual machine to a foreign source IP address.

In one embodiment, an instance of a virtual machine with a Bind ID is created using the following command:

virtual <virtual IP address> [:virtual port] [:Bind ID] [service state]

The virtual IP address is the virtual machine's IP address. A port for the virtual machine may be specified. If no port number is specified, then a port number of 0 is assigned, which is the default port. A Bind ID may also be specified. If no Bind ID is specified, a Bind ID of zero is assigned. A service state may also be specified. In one embodiment a service state of in service or out of service is allowed. Thus, specific instances of virtual machines having Bind ID's may be created. In one embodiment, the following command is used to assign an instance of a virtual machine to a Client:

assign <Vmach specification> <client IP address> <subnet mask>

The Vmach specification specifies an instance of a virtual machine object that includes a Bind ID. The Client IP address is the IP address of the Client assigned to the instance of the virtual machine and the subnet mask allows all Clients in a given subnet to be assigned to the same instance of the virtual machine with one command. When a virtual machine is assigned to a Client, a Bind ID object as shown in FIG. 3D is created. Incoming SYN packets from a Client that matches the Client IP address found in the Bind ID object will be assigned to the virtual machine object that the Bind ID object points to.

Figure 4:
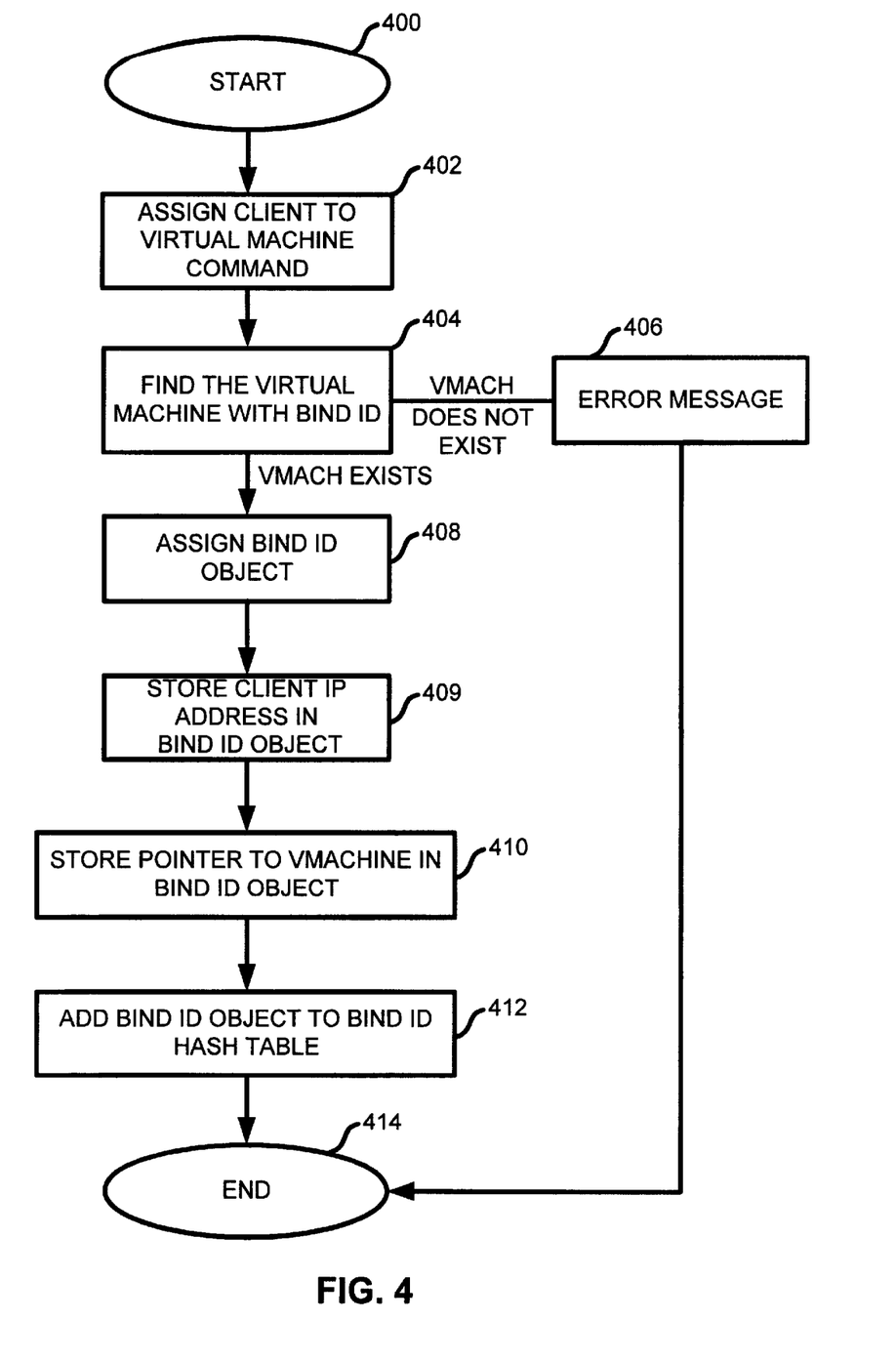
FIG. 4 is a flow chart illustrating the process of creating a Bind ID object.

FIG. 4 is a flow chart illustrating the process of creating a Bind ID object. The process starts at 400. In a step 402, the user assigns a Client to a virtual machine by using the assign command described above. Next, in a step 404, the virtual machine with the Bind ID specified in the assign command is found. If the virtual machine does not exist, control is transferred to a step 406 and an error message is sent. The process then ends at 414. If a virtual machine with the specified Bind ID exists, control is transferred to a step 408 and a Bind ID object is assigned to be used. Next, in a step 409, the Client IP address is stored in the assigned Bind ID object. Then, in a step 410, a pointer to the instance of a virtual machine that was found in step 404 is stored in the Bind ID object. Next, in a step 412, the Bind ID object is added to the Bind ID object hash table that is used to search through the Bind ID objects. In other embodiments, other methods of searching for Bind ID's and other data structures for storing Bind ID's are used. The process then ends and 414. Once the process described in FIG. 4 has been executed, a Bind ID object that specifies an instance of a virtual machine to handle Client connections has been created. The process for checking Bind ID objects when a SYN packet for a new connection is received is described in FIG. 5.

Figure 5:
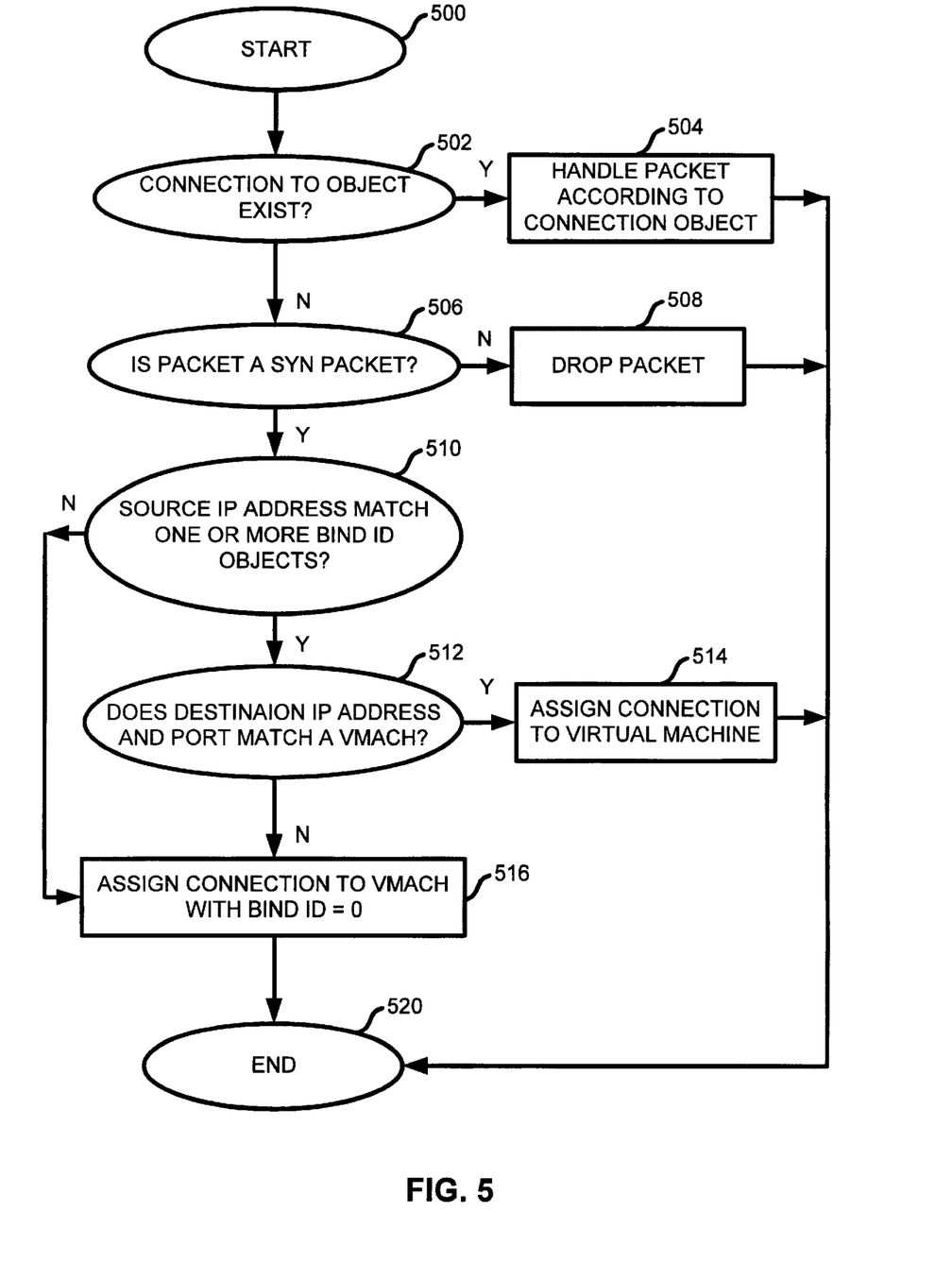
FIG. 5 is a flow chart illustrating a process for handling an incoming packet.

FIG. 5 is a flow chart illustrating a process for handling an incoming packet. The process starts at 500. In a step 502, the Local Director checks whether a connection object exists. This is done by matching the source and destination IP addresses and port numbers of the packet with the foreign and virtual IP addresses and port numbers stored in a connection object. If a matching connection object exists, then the packet corresponds to an existing connection that has already been assigned to a physical machine. For an incoming packet, the connection object provides the IP address and port number of the physical machine that is to handle the connection. The packet destination IP address and port number are translated to the physical machine IP address and port number. For an outgoing packet, the connection object provides the IP address and port number of the virtual machine that is being simulated. The packet source IP address and port number are translated to the virtual IP address and port number so that the packet appears to have originated from the virtual machine. If a connection object exists, control is transferred to a step 504 and the packet is handled according to the information found in the connection object. The process then ends at 520.

If no connection object exists, control is transferred to a step 506 and the Local Director checks whether the packet is a SYN packet. If the packet is not a SYN packet, then control is transferred to a step 508 and the packet is dropped. It should be noted that in other embodiments such packets may be bridged or handled in some other manner. The process then ends at 520. If the packet is a SYN packet then control is transferred to a step 510 and it is checked whether the source IP address matches a Client specified in one or more Bind ID objects. If the source address does match one or more Bind ID objects, then control is transferred to a step 512. In step 512, it is checked whether the destination IP address and port matches a virtual machine that is specified in one of the Bind ID objects found in step 510. If a virtual machine is found, then control is transferred to a step 514 where the connection is assigned to the virtual machine that is specified by the Bind ID object and matches the destination IP address of the incoming SYN packet.

Once the virtual machine is selected, the connection is assigned to one of the physical machines that is bound to the virtual machine using a load balancing scheme such as is described in [Load Balancing Application]. Some of the load balancing schemes used may include distributing new connections to the physical machine with the fewest connections, to the physical machine with the fastest measured response time, or to a physical machine chosen in a round robin or weighted round robin fashion. The selection of the virtual machine by matching the Bind ID object to the Client IP address given as the packet source IP address causes the selection of the physical machine to be dependent on the Client IP address.

If the destination IP address and port do not match a virtual machine then control is transferred to a step 516 and the connection is assigned to a virtual machine with a Bind ID of 0. Also, if in step 510, the source IP address does not match one or more Bind ID objects, then control is also transferred to step 516 and the connection is assigned to a virtual machine with a Bind ID of 0. Once the connection is assigned to a virtual machine either in step 514 or step 516, the process ends at 520. Thus, it has been shown that a new connection may be assigned to a specific instance of a virtual machine based on the assignment of that virtual machine to certain Client IP addresses. Once the virtual machine is found for a Client, load balancing among the physical machines that are designated by the virtual machine is accomplished. Thus, by specifying a Bind ID for an object with an associated instance of a virtual machine, traffic from that Client is load balanced among a special set of physical machines designated by the virtual machine object. In addition, special processes that are customized for the Client may be run on the physical machines associated with the virtual machine object. The Client never has to specify a special IP address. It can be the same IP address that any user would discover using DNS. The Client connection is assigned to a different physical machine as a result of the Local Director analyzing the source IP address of the SYN packet that starts the connection. The process of selecting a special physical machine for the Client is completely transparent to the Client. When packets are sent to the Client from the physical machine, the source address in the outgoing packets is translated so that it appears to the Client that the packets are coming from the destination IP address specified by the Client when the connection was requested.

Figure 6:
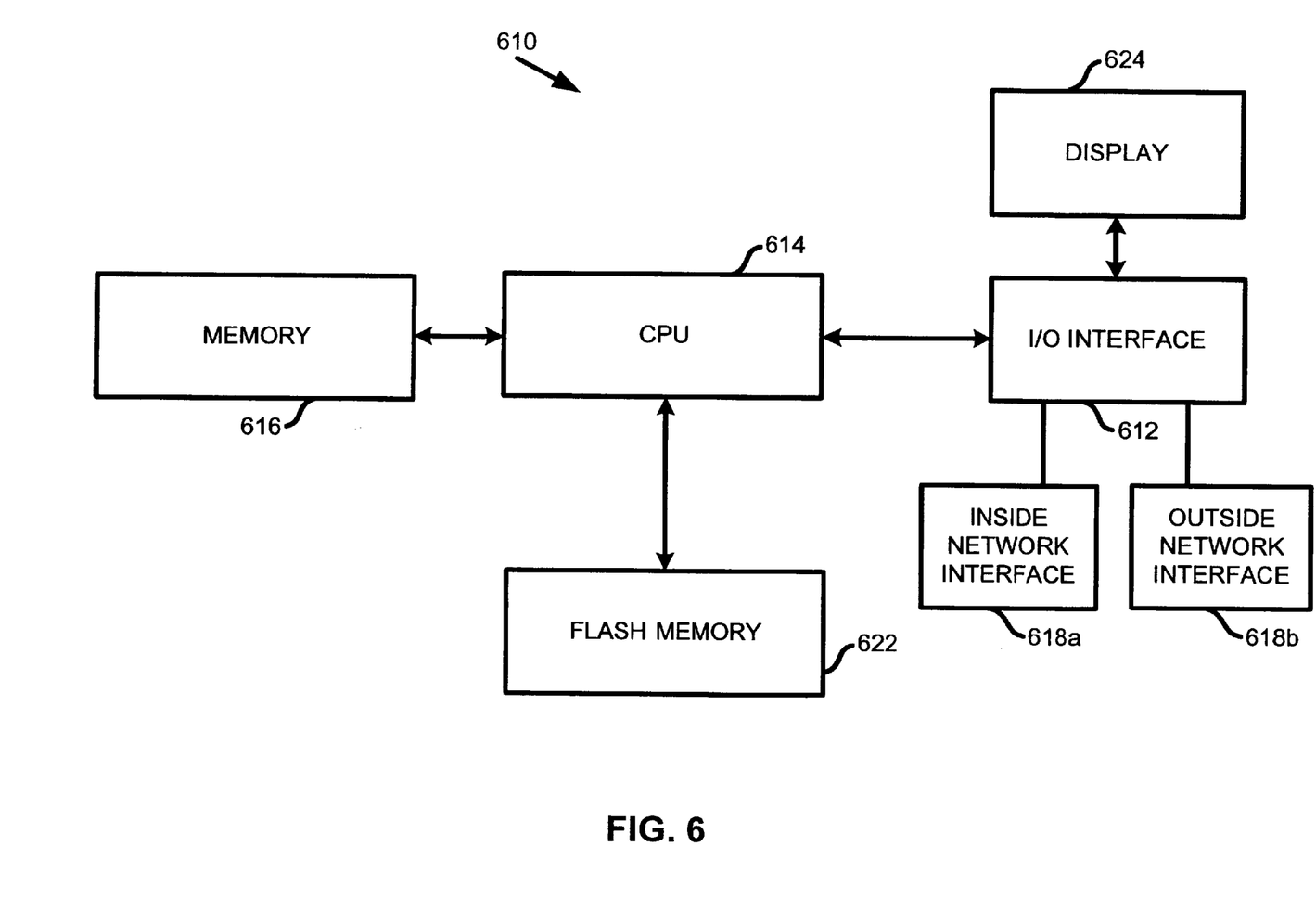
FIG. 6 illustrates a typical computer-based system which may be used as a Local Director of the present invention.

FIG. 6 illustrates a typical computer-based system which may be used as a Local Director of the present invention. Shown is a computer 610 which comprises an input/output interface 612 used to communicate information in appropriately structured form to and from the parts of computer 610 and associated equipment, a central processing unit 614, and a memory 616. These components are those typically found in most general and special purpose computers 610 and are intended to be representative of this broad category of data processors.

Connected to the input/output circuit 612 are inside and outside high speed Local Area Network interfaces 618*a* and 618*b*. The inside interface 618*a* is connected to a private network, while the outside interface 618*b* is be connected to an external network such as the Internet. Preferably, each of these interfaces includes (1) a plurality of ports appropriate for communication with the appropriate media, (2) associated logic, and in some instances (3) memory. The associated logic may control such communications intensive tasks as packet integrity checking and media control and management. The high speed interfaces 618*a* and 618*b* are preferably multiport Ethernet interfaces, but may be other appropriate interfaces such as FDDI interfaces, etc.

The computer system may also include an input device (not shown) such as a keyboard. A flash memory device 622 is coupled to the input/output circuit 612 and provides additional storage capability for the computer 610. The flash memory device 622 may be used to store programs, data and the like and may be replaced with a magnetic storage medium or some other well known device. It will be appreciated that the information retained within the flash memory device 622, may, in appropriate cases, be incorporated in standard fashion into computer 610 as part of the memory 616.

In addition, a display monitor 624 is illustrated which is used to display output messages or images generated by the present invention. Such a display monitor 24 may take the form of any of several well-known varieties of cathode ray tube displays and flat panel displays or some other type of display.

Although the system shown in FIG. 6 is a preferred computer system of the present invention, the displayed computer architecture is by no means the only architecture on which the present invention can be implemented. For example, other types of interfaces and media could also be used with the computer.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of assigning an incoming connection to a server comprising:

providing a client specific virtual machine object instance that is associated with a designated client IP address;

receiving an incoming packet associated with a new connection, the incoming packet having a packet source IP address, a packet source port number, a packet destination IP address, and a packet destination port number;

verifying that the incoming packet does not match an existing connection object;

selecting the client specific virtual machine object instance that is associated with the designated client IP address when the packet source IP address matches the designated client IP address; and translating the packet destination IP address to a physical machine IP address that is designated by the client specific virtual machine instance when the packet source IP address matches the designated client IP address;

whereby the client specific virtual machine instance is selected when the designated client IP address matches the packet source IP address and the packet is routed to the physical machine that is designated by the client specific virtual machine instance.

2. A method of assigning an incoming connection to a server as recited in claim 1 further including:

providing a general virtual machine instance that is associated with undesignated client IP addresses;

selecting the general virtual machine instance that is associated with undesignated client IP addresses when no designated client IP address that is associated with a client specific virtual machine instance matches the packet source IP address; and translating the packet destination IP address to a physical machine IP address that is designated by the general virtual machine instance when no designated client IP address that is associated with a client specific virtual machine instance matches the packet source IP address.

3. A method of assigning an incoming connection to a server as recited in claim 1 wherein translating the packet destination IP address to a physical machine IP address that is designated by the client specific virtual machine instance includes selecting the physical machine IP address from a plurality of physical machine IP addresses that are bound to the client specific virtual machine instance using a load balancing scheme.

4. A method of assigning an incoming connection to a server as recited in claim 1 further including translating the packet destination port to a physical machine port that is designated by the client specific virtual machine instance.

5. A method of assigning an incoming connection to a server as recited in claim 4 wherein a client specific process runs on the physical machine port that is designated by the client specific virtual machine instance.

6. A method of assigning an incoming connection to a server as recited in claim 5 wherein the client specific process includes a special welcome message to preferred site users.

7. A method of assigning an incoming connection to a server as recited in claim 5 wherein the client specific process includes an unwelcome message for site abusers.

8. A method of assigning an incoming connection to a server as recited in claim 1 further including determining whether the incoming packet is a SYN packet.

9. A method of assigning an incoming connection to a server as recited in claim 1 further including storing a Bind ID in the virtual machine object instance, the virtual machine object being a number that distinguishes the virtual machine object instance from other instances of the virtual machine object that include the same foreign IP address and virtual IP address.

10. A method of assigning an incoming connection to a server as recited in claim 1 further including creating a Bind ID object that includes a Client IP address and a pointer to the virtual machine object instance.

11. A method of assigning an incoming connection to a server as recited in claim 10 wherein selecting the client specific virtual machine object instance includes matching the Client IP address to the source IP address of an incoming SYN packet that is received for a new connection and selecting the virtual machine object instance indicated by the pointer.

12. A method of assigning an incoming connection to a server as recited in claim 10 wherein the Bind ID object includes a subnet mask for the Client IP address.

13. A method of assigning an incoming connection to a server as recited in claim 10 wherein plurality of Bind ID objects are created and the Bind ID objects are stored in a linked list.

14. A method of assigning an incoming connection to a server comprising:

provinding a client specific virtual machine object instance that is associated with a designated client IP address;

receiving an incoming packet associated with a new connection, the incoming packet having a packet source IP address, a packet source port number, a packet destination IP address, and a packet destination port number;

verifying that the incoming packet does not match an existing connection object;

selecting the client specific virtual machine object instance that is associated with the designated client IP address when the packet source IP address matches the designated client IP address; and translating the packet destination IP address to a physical machine IP address that is designated by the client specific virtual machine instance when the packet source IP address matches the designated client IP address;

whereby the client specific virtual machine instance is selected when the designated client IP address matches the packet source IP address and the packet is routed to the physical machine that is designated by the client specific virtual machine instance.

15. A Local Director that distributes connections to a group of servers as recited in claim 14 wherein the network address translator selects the physical machine IP address from a plurality of physical machine IP addresses that are bound to the client specific virtual machine instance using a load balancing scheme.

16. A Local Director that distributes connections to a group of servers as recited in claim 14 wherein the network address translator translates the packet destination port to a physical machine port that is designated by the client specific virtual machine instance.

17. A method of assigning an incoming connection to a server comprising:

associating a virtual machine with a designated client IP address;

receiving an incoming packet associated with a new connection, the incoming packet having a packet source IP address, a packet source port number, a packet destination IP address, and a packet destination port number;

selecting the virtual machine that is associated with the designated client IP address when the packet source IP address matches the designated client IP address; and translating the packet destination IP address to a physical machine IP address that is associated with a physical machine that is associated with the virtual machine;

whereby the client specific virtual machine is selected when the designated client IP address matches the packet source IP address and the packet is routed to the physical machine that is associated with the virtual machine.

18. A system of assigning an incoming connection to a server comprising:

means for providing a client specific virtual machine object instance that is associated with a designated client IP address;

means for receiving an incoming packet associated with a new connection, the incoming packet having a packet source IP address, a packet source port number, a packet destination IP address, and a packet destination port number;

means for verifying that the incoming packet does not match an existing connection object;

means for selecting the client specific virtual machine object instance that is associated with the designated client IP address when the packet source IP address matches the designated client IP address; and means for translating the packet destination IP address to a physical machine IP address that is designated by the client specific virtual machine instance when the packet source IP address matches the designated client IP address;

whereby the client specific virtual machine instance is selected when the designated client IP address matches the packet source IP address and the packet is routed to the physical machine that is designated by the client specific virtual machine instance.

19. A computer program product for assigning an incoming connection to a server, comprising:

computer code providing a client specific virtual machine object instance that is associated with a designated client IP address;

computer code receiving an incoming packet associated with a new connection, the incoming packet having a packet source IP address, a packet source port number, a packet destination IP address, and a packet destination port number;

computer code verifying that the incoming packet does not match an existing connection object;

computer code selecting the client specific virtual machine object instance that is associated with the designated client IP address when the packet source IP address matches the designated client IP address;

computer code translating the packet destination IP address to a physical machine IP address that is designated by the client specific virtual machine instance when the packet source IP address matches the designated client IP address;

whereby the client specific virtual machine instance is selected when the designated client IP address matches the packet source IP address and the packet is routed to the physical machine that is designated by the client specific virtual machine instance; and a computer readable medium that stores the computer codes.

* * * * *